3,814,621
METHODS OF AND MEANS FOR COATING ARTICLES EMPLOYING SONIC ENERGY

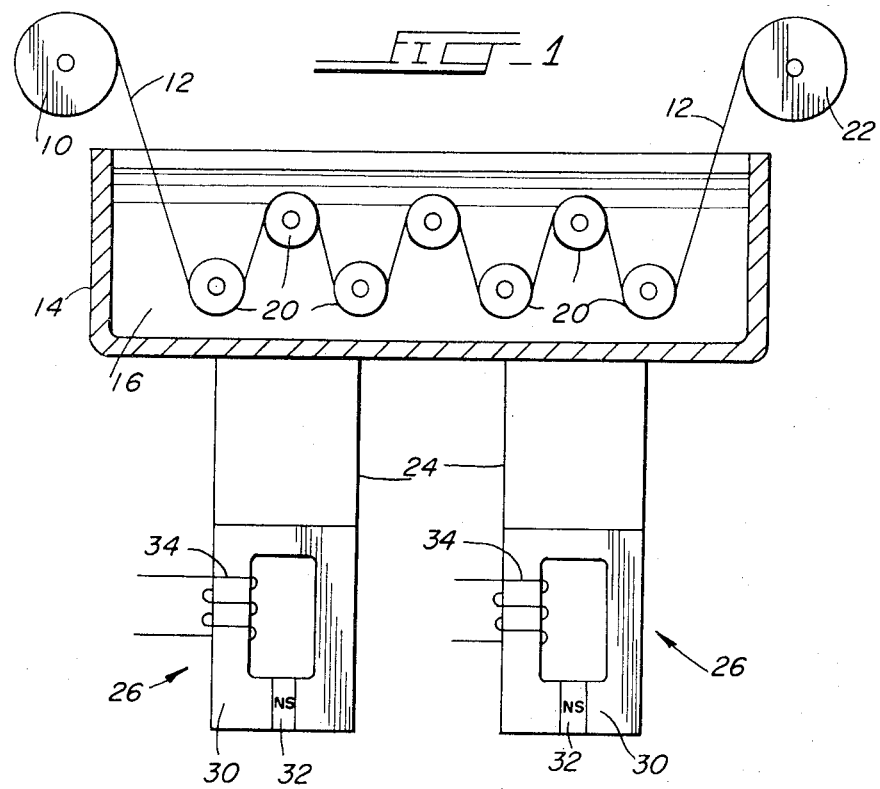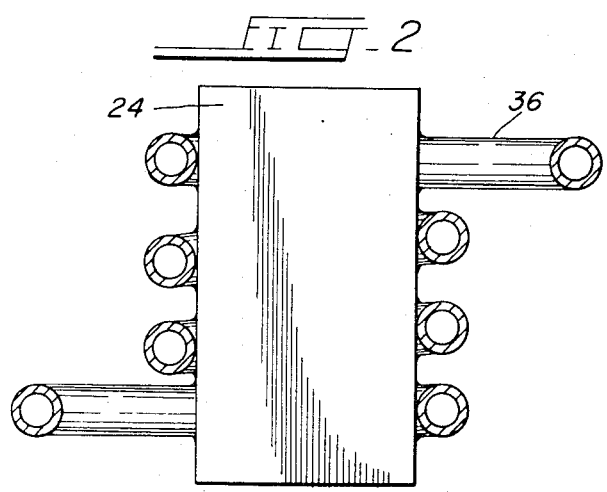

Frank Massa, Cohasset, Mass., assignor to Massa Division Dynamics Corporation of America, Hingham, Mass.

Application Oct. 24, 1969, Ser. No. 869,282, now Patent No. 3,685,487, which is a continuation of abandoned application Ser. No. 614,604, Feb. 8, 1967. Divided and this application Jan. 26, 1972, Ser. No. 221,110

Int. Cl. C23c 1/04

U.S. Cl. 117—114 B      2 Claims

ABSTRACT OF THE DISCLOSURE

A coating or tinning is applied to an aluminum wire by a continuous manufacturing process. The wire is immersed in and drawn through a sonically activated bath of a molten zinc-tin alloy. The sonic activity removes the surface oxide and enables the tinning material to adhere to the aluminum surface.

---

This is a division of application Ser. No. 869,282, filed Oct. 24, 1969, now Pat. No. 3,685,487 which is a continuation of Ser. No. 614,604, filed Feb. 8, 1967, now abandoned.

This invention relates to means for and methods of continuously coating metallic strips or filaments and in particular to the continuous tinning of aluminum wire.

Many things have become known as classic inventions which have been discovered in the past or are hopefully expected in the future. Among these classically hoped for inventions is a solderable aluminum wire. This is because aluminum is an excellent conductor of electricity which is less expensive than copper. Nevertheless, aluminum is not generally considered an economical substitute for copper because its oxide coating makes it almost impossible to solder the aluminum. Heretofore, there was no practical way of removing the oxide surface during a continuous production run in order to produce a uniformly tinned aluminum wire.

Even if an aluminum wire could be cleansed or abraded of its oxide surface, it still could not be easily tinned, as is customary with copper wire, since the aluminum oxide reforms almost instantly. By the time the tinning is applied to the aluminum, the reformed oxide has precluded tinning or soldering.

In order to meet the sought after goal of a solderable aluminum wire, it is necessary to provide an aluminum wire which is (1) competitive with copper wire, (2) in production quantities, and (3) at commercially acceptable prices. It seems too self-evident for words that such an aluminum substitute for copper wire is a highly desirable commodity which will benefit manufacturer and consumer alike.

Among other things, the advantages of such a uniformly tinned aluminum wire are (A) to reduce the demand for the more scarce copper, (B) to free the national industrial demands from a present high degree of reliance upon foreign copper sources, and (C) to reduce the out-flow of money from the national economy to other countries. In times of national emergency, the availability of substitutes for critical materials contributes greatly to everyone's betterment and to the defense of the country. Those who have reflected on the subject will perceive still other advantages. Nevertheless, no solderable aluminum wire of the described type is now available.

Accordingly, an object of this invention is to provide means for and methods of removing oxide and other inhibitors in order to continuously and uniformly coat or tin aluminum wires or strips. In this connection, an object is to produce (1) a solderable aluminum wire having a uniform coating of a tin composition deposited thereon, (2) by a continuous production process, and (3) with low cost manufacturing equipment.

In particular, an object to place uniformly tinned aluminum wire on the commercial market at attainable prices.

Another object is to provide a manufacturing process which will be able to meet the emergency needs of the nation for electrical wires regardless of the then current availabilty of copper.

In keeping with an aspect of the invention, these and other objects of the invention are accomplished by continuously coating aluminum wire in a molten tinning alloy. The molten alloy bath is contained in an elongated trough bath so that a substantially continuous length of wire can be drawn therethrough. The bath is agitated by sonic energy, which sonic energy gradient is substantially uniform throughout the entire trough. The bath does not necessarily have to have any particular geometrical shape as long as the immersed wire travels over an appreciable distance of sonically agitated molten alloy while it is in the bath. This way, the sonic energy cleans off the oxide layer while the aluminum is in the bath so that a tinned coating will adhere to the aluminum before oxygen can reach the cleaned surface.

These and other objects are accomplished by a preferred embodiment described in the following specification when taken with the attached drawings, in which:

FIG. 1 is a diagrammatic view of a preferred system for tinning aluminum wire, according to the principles of this invention; and FIG. 2 is an enlarged diagrammatic view of a sonic transmission line combined with a sonic transducer for supplying sonic energy to a molten tinning bath.

In FIG. 1, a spool 10 of aluminum wire 12, to be tinned, is mounted over one end of an elongated trough or metallic tank 14 containing a molten tinning bath 16. The tinning bath 16 is kept molten by means of a thermostatically controlled heating element (not shown) which may be of any conventional type. The wire is passed over a group of idler pulleys 20 or other suitable means immersed in the molten tinning bath 16. A motor-driven reel 22 is mounted over the other end of the tank 14 to take up the wire 12 when it emerges from the tank after having been pulled through the bath for a few seconds.

Means are provided for agitating the bath with sonic energy which is substantially uniform throughout the bath. In greater detail, a number of solid sonic transmission lines 24 are attached, in intimate sonic contact, with the bottom of the tank 14. For example, the ends of these transmission lines may be brazed to the bottom surface of the metallic tank 14. These transmission lines are capable of radiating sonic energy through the bottom of tank 14 and directly into the molten tinning bath 16. In the preferred embodiment, the length of the transmission lines 24 equals one-half wavelength of the sonic signal transmitted through the lines. Such a transmission line is hereinafter referred to as a "one-half wavelength" transmission line.

Alternatively, the transmission lines may pass through openings cut through the wall of the tank 14. If so, a suitable seal should be provided at the point where the line makes its entrance into the tank. Such a seal may be in the form of pliable gasket or O-ring fabricated from high temperature silicone rubber which can withstand the temperature effect of the molten tinning bath.

Conventional sonic transducers 26 are attached to the opposite ends of the transmission lines 24. These transducers may include magnetostrictive vibrators, each comprising a stack of nickel laminations 30 polarized by permanent magnets 32. Alternating current coils 34 supply alternating magnetic flux to the stacks for operating the magnetostrictive transducer at its resonant frequency.

The one-half wavelength transmission lines 24 may be made of stainless steel, a homogeneous ceramic, glass, or other suitable material which is an efficient conductor of the sonic energy generated by the transducer 26. If the transmission lines 24 are fabricated from a suitable high temperature glass or ceramic which has low thermal conductivity, they also serve as a suitable insulator between the high temperature molten bath 16 and the transducer 26. On the other hand, if the transmission lines 24 are fabricated from metals or other good heat conductors, means are required for cooling the transducers.

One system for cooling the transducers 26 is illustrated in FIG. 2. More particularly, a metallic cooling tube 36 is coiled around the body of the transmission lines 24. Good thermal contact between the transmission lines 24 and the tube 36 is obtained by brazing or welding the tube to the transmission lines. A coolant is circulated through the tube 36 for dissipating the heat from the transmission lines 24 so that the temperature at the surface of transducer laminations 30 is limited to a safe magnitude.

When the molten tinning bath is sonically activated with high intensity sonic energy, the oxide covering is removed from the submerged wire. A continuously uniform coating of a tin composition will then adhere to the surface of the sonically cleansed aluminum wire. Thereafter, the tinned wire may be easily soldered by conventional means.

Although the composition of the tinning alloy is not extremely critical, excellent results are obtained with an alloy of approximately 95% tin and 5% zinc, by weight. Also, the rate at which the wire is pulled through the molten tinning bath is not extremely critical. Among other things, this speed is dependent on the number of idler pulleys or other submerging means over which the wire passes and, therefore, the distance which the wire travels, before being withdrawn from the molten solution. The tinning process is achieved without requiring a flux since the aluminum remains immersed, away from oxygen, in the sonically activated tinning bath.

The composition of the alloy may vary somewhat from the preferred 95% tin and 5% zinc composition. Experimentally, a 92% tin and 8% zinc composition having a solidus temperature of 390 degrees Fahrenheit is acceptable. In addition, a 95% tin and 5% silver alloy content has been used wherein the solidus temperature is 430 degrees Fahrenheit. Other types of hard tin alloy solders having a tin composition in the range of from about 90 to 98 percent are adaptable wherein the other alloy constituent may be antimony, copper, lead, silver and indium and/or combinations of these element constituents.

Although this invention has been described in connection with means for and a method of tinning aluminum wire, the same process may be used for tinning or coating other filaments, wires, or strips. Non-metallic coatings may be applied at room temperatures if the coating is in a liquid state at room temperatures. The ultrasonic activation of the solution will thoroughly clean the strip or wire when it is immersed in the sonically activated coating solution and will thereby produce a completely porous-free, homogeneous coating which cannot be attained by conventional methods. For example, if a wire or a strip is to be coated with a non-conducting film by a conventional process of feeding the wire through the coating solution without sonic activation, the coating on the wire or the strip may be porous in spots due to the presence of dirt on the wire which would prevent complete wetting of the wire or strip by the coating material.

A preferred embodiment of a sonic tinning bath has been illustrated. One type of sonically activated tinning process has been described. It will be appreciated, however, that a number of modifications may be made without departing from the spirit of the invention. Therefore, the following claims are to be construed to cover all equivalent structures.

I claim:
1. A product made by the process of:
 (a) feeding a continuous length of aluminum wire from a substantial source of wire through an elongated trough containing a bath of molten tinning alloy;
 (b) immersing said wire in said molten bath of tinning alloy and moving said wire throughout said entire trough;
 (c) maintaining a substantially uniform temperature throughout said bath while said wire is being drawn from said source;
 (d) sonically activating said molten bath with a substantially uniform non-concentrated field of sonic energy distributed substantially uniformly throughout the entire trough, whereby said wire experiences a continuously uniform environment while said wire is immersed in and fed through said bath, said sonic energy being limited to a level which is sufficient to remove the oxide layer from the surface of said wire if said wire is drawn throughout substantially the entire length of said trough; and
 (e) withdrawing said wire from said bath without disturbing said coating.
2. A method of manufacturing a solderable aluminum wire including the following steps:
 (a) feeding a continuous length of aluminum wire from a substantial source of wire;
 (b) continuously immersing in and drawing said wire through an elongated trough containing a molten bath of tinning alloy of substantially uniform temperature while it is being drawn from said source;
 (c) sonically activating said molten bath in its entirety with a non-concentrated and substantially uniformly distributed field of sonic energy whereby said wire experiences substantially uniform environmental conditions as it travels throughout substantially the entire length of said trough while said wire is immersed in and fed through said bath, said sonic energy being limited to a level which is sufficient to remove the oxide layer from the surface of said wire after it has been drawn through substantially the entire length of the trough; and
 (d) withdrawing said wire from said bath at the end of the trough.

References Cited
UNITED STATES PATENTS

| | | | |
|---|---|---|---|
| 2,397,400 | 3/1946 | Barwich | 117—114 R X |
| 3,410,534 | 11/1968 | Wyczalek | 117—114 R X |
| 2,895,845 | 7/1959 | Jones et al. | 117—114 R X |
| 2,970,933 | 2/1961 | Barera et al. | 117—114 R X |
| 3,371,703 | 3/1968 | De Wilde | 117—114 R X |

FOREIGN PATENTS

| | | | |
|---|---|---|---|
| 895,085 | 10/1953 | Germany | 117—Dig. 8 |
| 849,503 | 9/1952 | Germany | 117—114 C |
| 719,461 | 4/1942 | Germany | 117—114 R |
| 959,607 | 3/1957 | Germany | 117—114 B |
| 725,720 | 9/1942 | Germany | 117—114 R |
| 886,576 | 8/1953 | Germany | 117—Dig. 8 |

RALPH S. KENDALL, Primary Examiner

U.S. Cl. X.R.

117—Dig. 8, 51, 114 A